(12) United States Patent
Zhou et al.

(10) Patent No.: US 11,658,580 B2
(45) Date of Patent: May 23, 2023

(54) CONTROL METHOD FOR DC CONVERTER AND DC CONVERTER (71) Applicant: Delta Electronics (Shanghai) CO., LTD, Shanghai (CN)

(72) Inventors: Pian Zhou, Shanghai (CN); Teng Liu, Shanghai (CN); Dehai Lou, Shanghai (CN); Hongwei Xiao, Shanghai (CN); Yi Zhang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 11 days.

(21) Appl. No.: 17/316,873

(22) Filed: May 11, 2021

(65) Prior Publication Data
US 2021/0359611 A1 Nov. 18, 2021

(30) Foreign Application Priority Data
May 14, 2020 (CN) .......................... 202010407556.8

(51) Int. Cl.
*H02M 3/335* (2006.01)
*H02M 1/00* (2006.01)
(Continued)

(52) U.S. Cl.
CPC ..... *H02M 3/33573* (2021.05); *H02M 1/0035* (2021.05); *H02M 1/0058* (2021.05);
(Continued)

(58) Field of Classification Search
CPC .......... H02M 3/01; H02M 3/015; H02M 3/22; H02M 3/24; H02M 3/28; H02M 3/315;
(Continued)

(56) References Cited

U.S. PATENT DOCUMENTS 6,307,356 B1 10/2001 Dwelley
9,143,043 B2 * 9/2015 Zhang ............... H02M 3/33507
(Continued)

FOREIGN PATENT DOCUMENTS

CN 103138581 B 8/2015
CN 107078647 A 8/2017
(Continued)

OTHER PUBLICATIONS

The 1st Office Action dated Jan. 6, 2022 for Taiwanese patent application No. 110116992.
(Continued)

*Primary Examiner* — Thienvu V Tran
*Assistant Examiner* — Carlos O Rivera-Perez
(74) *Attorney, Agent, or Firm* — Qinghong Xu (57) ABSTRACT The present disclosure provides a control method for a DC converter and a DC converter. the DC converter comprises a switching circuit, a sampling circuit, and a controller, the method comprising: acquiring a duty ratio of a Burst cycle according to an output reference signal and an output signal; acquiring a first number of switching cycles and a burst on time according to the duty ratio of the Burst cycle, a first preset value, and a switching period of the switching device; acquiring a Burst cycle value according to the burst on time and the duty ratio of the Burst cycle; and generating a driving signal according to the Burst cycle value, the first number of switching cycles, and the switching period.

19 Claims, 9 Drawing Sheets

(51) Int. Cl.
*H02M 1/08* (2006.01)
*H02M 1/14* (2006.01)

(52) U.S. Cl.
CPC ............. *H02M 1/083* (2013.01); *H02M 1/14* (2013.01); *H02M 3/33571* (2021.05)

(58) Field of Classification Search
CPC .... H02M 3/3155; H02M 3/325; H02M 3/335; H02M 3/33507; H02M 3/33515; H02M 3/33523; H02M 3/3353; H02M 3/33538; H02M 3/33546; H02M 3/33553; H02M 3/33569; H02M 3/33571; H02M 3/33573; H02M 3/33576; H02M 3/33584; H02M 3/33592; H02M 1/0003; H02M 1/0016; H02M 1/0019; H02M 1/0025; H02M 1/0032; H02M 1/0035; H02M 1/0058; H02M 1/083; H02M 1/14; H02M 1/143; H02M 1/15; H02M 1/36; H02M 1/4241; Y02B 70/10
USPC ......... 363/15–21.18, 40–43, 74, 95–99, 106, 363/109, 123–134; 323/235, 237, 238, 323/266, 271–275, 282–285, 351
See application file for complete search history.

(56) References Cited

U.S. PATENT DOCUMENTS

| | | | |
|---|---|---|---|
| 9,318,966 | B2 | 4/2016 | Ferrazza et al. |
| 2011/0176335 | A1 | 7/2011 | Li et al. |
| 2012/0250361 | A1* | 10/2012 | Hu ................... H02M 3/33571 363/21.02 |
| 2016/0113086 | A1* | 4/2016 | Chitta .................... H05B 45/10 315/307 |
| 2018/0191256 | A1 | 7/2018 | Giombanco et al. |

FOREIGN PATENT DOCUMENTS

| | | |
|---|---|---|
| CN | 109245531 A | 1/2019 |
| CN | 109802569 A | 5/2019 |
| TW | 201815043 A | 4/2018 |

OTHER PUBLICATIONS

1st Office Action dated Nov. 28, 2022 of Chinese Application No. 202010407556.8.

* cited by examiner

CONTROL METHOD FOR DC CONVERTER AND DC CONVERTER

CROSS REFERENCE

This application is based upon and claims priority to Chinese Patent Application No. 202010407556.8, filed on May 14, 2020, the entire content of which is incorporated herein by reference.

TECHNICAL FIELD

The present disclosure relates to the field of power electronics technology, in particular, to a control method for a DC converter and a DC converter.

BACKGROUND

In application fields such as electric vehicle charging, etc., there are extremely high requirements for output voltage ripple. According to requirements of China's energy industry standard "Specification for electric vehicle off-board conductive charger" (NB/T 33001-2018), when an output current of a charger changes within a range of the maximum output current value, a ripple factor of the output voltage should not be greater than 1%.

LLC resonant converter has advantages of high efficiency and high power density and so on due to its soft switching characteristics, and is widely used in the field of DC-DC conversion.

LLC generally adopts an intermittent mode control method (a Burst control method) when it is running under no load or light load. The Burst control method alternately enables pulses and disables pulses to make a power supply intermittently supply power to the load, thereby reducing output power and then meeting the load requirements. Generally, a Burst cycle includes a burst on time and a burst off time. Main factors affecting ripples of an output voltage and an output current are the burst on time, the burst off time, the Burst cycle, the output capacitance value and the load. While, under the same circuit parameters and load conditions, the output ripple is mainly affected by the Burst cycle.

When a digital control system is used to realize the Burst control, the Burst cycle is usually affected by a control cycle. The digital controller determines whether to enable or disable the pulses in each of the control cycles, so that periods for enable pulses and disable pulses are integer multiples of the control cycle, and the Burst cycle is also an integer multiple of the control cycle. When the control cycle is long, the Burst cycle is long too, so the output ripple is large. However, a control cycle of a digital control chip in the digital control system is affected by chip resources, etc., and it is impossible to shorten without limitation, so as to achieve the effect of analog control. When a control frequency is limited and an output capacitance is small, the output ripple of the circuit will be larger under the conditions of no-load or light load.

It should be noted that the information disclosed in the above Background section is only used to enhance the understanding of the background of the present disclosure, and therefore may include information that does not constitute the prior art known to those of ordinary skill in the art.

SUMMARY

According to a first aspect of embodiments of the present disclosure, there is provided a control method for a Direct Current (DC) converter, the DC converter includes a switching circuit, a sampling circuit, and a controller, and the sampling circuit is electrically connected with an output terminal of the DC converter and the controller, and configured to sample an output signal of the DC converter and send the output signal to the controller, and the controller is coupled to the switching circuit and configured to generate a driving signal according to the output signal, so as to drive a switching device in the switching circuit, wherein the control method includes following steps: acquiring a duty ratio of a Burst cycle according to an output reference signal and the output signal; acquiring a first number of switching cycles and a burst on time according to the duty ratio of the Burst cycle, a first preset value, and a switching period of the switching device; acquiring a Burst cycle value according to the burst on time and the duty ratio of the Burst cycle; and generating a driving signal according to the Burst cycle value, the first number of switching cycles, and the switching period.

According to a second aspect of embodiments of the present disclosure, there is provided a Direct Current (DC) converter, wherein the DC converter includes a switching circuit, a sampling circuit and a controller, wherein the sampling circuit is electrically connected with an output terminal of the DC converter and the controller, and configured to sample an output signal of the DC converter and send the output signal to the controller; wherein the controller is coupled to the switching circuit and configured to generate and send a driving signal to drive a switching device in the switching circuit, wherein the controller is configured to generate a driving signal according to the output signal, a first preset value, and a switching period of the switching device.

It should be understood that the above general description and the following detailed description are only exemplary and explanatory, and cannot limit the present disclosure.

BRIEF DESCRIPTION OF THE DRAWINGS

The drawings herein are incorporated into and constitute a part of this specification, show embodiments consistent with the present disclosure, and are used to explain the principles of the present disclosure together with the specification. Obviously, the drawings in the following description are only some embodiments of the present disclosure. For those of ordinary skill in the art, other drawings can be obtained based on these drawings without any creative effort.

DETAILED DESCRIPTION

Exemplary embodiments will now be described more fully with reference to the drawings. However, the exemplary embodiments can be implemented in various forms, and should not be construed as being limited to the examples set forth herein; rather, these embodiments are provided to make the present disclosure more comprehensive and complete, and fully convey the ideas of the exemplary embodiments to those skilled in the art.

Furthermore, the described features, structures or characteristics may be combined in one or more embodiments in any suitable manner. In the following description, many specific details are provided to give a sufficient understanding of the embodiments of the present disclosure. However, those skilled in the art will realize that the technical solutions of the present disclosure can be practiced without one or more of the specific details, or other methods, components, devices, steps, etc. can be used to practice the technical solutions of the present disclosure. In other cases, well-known methods, devices, implementations or operations are not shown or described in detail in order to avoid obscuring aspects of the present disclosure.

The block diagrams shown in the drawings are merely functional entities, and do not necessarily correspond to physically independent entities. That is, these functional entities can be implemented in the form of software, or implemented in one or more hardware modules or integrated circuits, or implemented in different networks and/or processor devices and/or microcontroller devices.

The flowchart shown in the drawings is only an exemplary description, and does not necessarily include all contents and operations/steps, nor does it have to be performed in the described order. For example, some operations/steps can be decomposed, and some operations/steps can be combined or partially combined, so the actual execution order may be changed according to actual conditions.

In related technologies, LLC generally adopts an intermittent mode control method (a Burst control method) to supply power to the load when it is running under no load or light load. When the control cycle is long, the Burst cycle is long correspondingly, resulting in a large output voltage ripple. Therefore, when the control frequency is limited, the output voltage ripple of the DC converter will be large, and even can't meet the design requirements.

Figure 1:
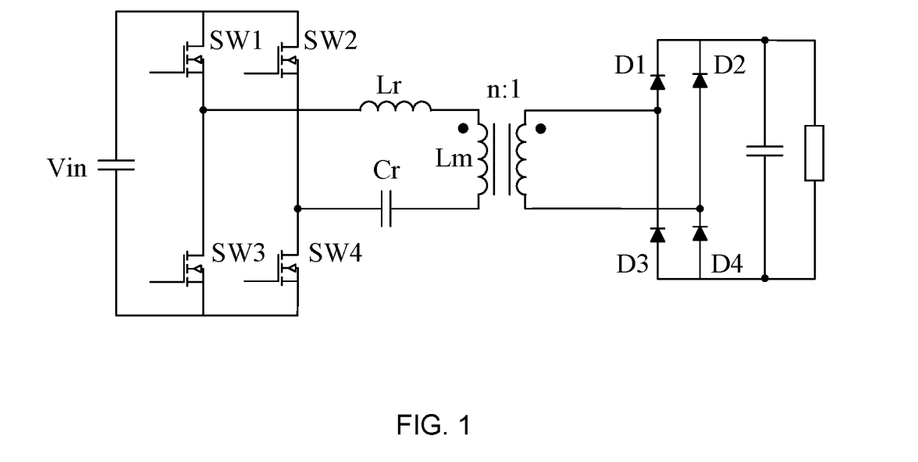
FIG. 1 schematically shows a structure diagram of a DC converter.
Figure 2:
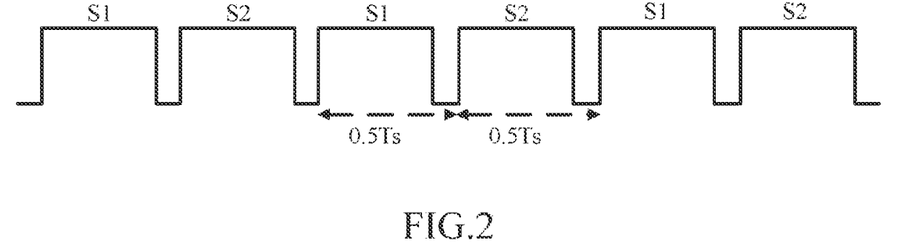
FIG. 2 schematically shows a sequence diagram of a driving signal of the DC converter shown in FIG. 1.

FIG. 1 shows a basic structure of LLC resonant converter. Lr is a resonant inductance, Cr is a resonant capacitance, Lm is a magnetizing inductance of a transformer, and n is a turn ratio of the transformer. Switches SW1, SW2, SW3, and SW4 are switching devices. Usually, a different output voltage can be obtained by adjusting the switching frequency of the LLC resonant converter. The driving signal is shown in FIG. 2, signal S1 is the drive signal of switch SW1 and switch SW4, signal S2 is the drive signal of switch SW2 and switch SW3, Ts is a switching period. Furthermore, switch SW1 and switch SW4 are driven synchronously, switch SW2 and switch SW3 are driven synchronously, switch SW1 and switch SW3 are driven complementarily, switch SW2 and switch SW4 are driven complementarily, and a duty ratio of driving for each of switches SW1, SW2, SW3 and SW4 is 50%. In a Burst mode, pulses are alternately enabled and disabled. During the pulse enable period (burst on time), the switches SW1, SW2, SW3, and SW4 are turned on and off with a 50% duty-cycle, respectively. During the pulse disable period (burst off time), the switches SW1, SW2, SW3, and SW4 are all in a turn-off state.

In the related art, a Burst cycle includes two parts, a burst on time Ton0 (that is, a time period in which the pulse is enabled) and a burst off time Toff0 (that is, a time period in which the pulse is disabled), and the burst on time Ton0 and the burst off time Toff0 are integer multiples of a control cycle Tctrl0, respectively. The burst off time Toff0 under a heavy load condition is greater than or equal to the control cycle Tctrl0, and an excessive long burst off time will cause the output voltage to go below a lower limit value during the burst off time. The burst on time Ton0 under a light load condition is greater than or equal to the control cycle Tctrl0, and an excessive long burst on time will cause the output voltage to go above an upper limit value during the burst on time. If the control cycle Tctrl0 is long, then the Burst cycle is long, resulting in large output ripple, which may not meet the requirements of loads on the output ripple.

On the other hand, under the same operating conditions, the smaller the Burst cycle is, the smaller the output ripple is, but the greater the switching loss is. This is due to the fact that the first switching cycle or the previous switching cycles of the burst on time are non-ZVS (Zero Voltage Switch), which increases the turn-on loss of the switching devices. Under the same load condition, the smaller the Burst cycle is, the more the number of the Non-ZVS, and then the greater the switching loss is. Therefore, on the premise of meeting the output ripple requirements, a value of the Burst cycle should be as large as possible to reduce the number of the Non-ZVS and to reduce switching loss.

The Burst control usually uses a Bang-Bang control algorithm, that is, by comparing a measured value of the output signal with a preset upper and lower limits, to enable or disable the pulses. The output ripple and steady-state accuracy of Bang-Bang control are affected by sampling accuracy, sampling delay, controlling bandwidth and controlling delay, etc. When the output requirements are high and the performance of the sensor or controller is limited, the output ripple may not meet the requirements.

In summary, how to reduce the output voltage ripple of the direct current (DC) converter under a light load condition is a technical problem that needs to be solved urgently.

The embodiments of the present disclosure provide a control method for a DC converter to reduce the output voltage ripple, and also provide a DC converter with low output voltage ripple.

Figure 3:
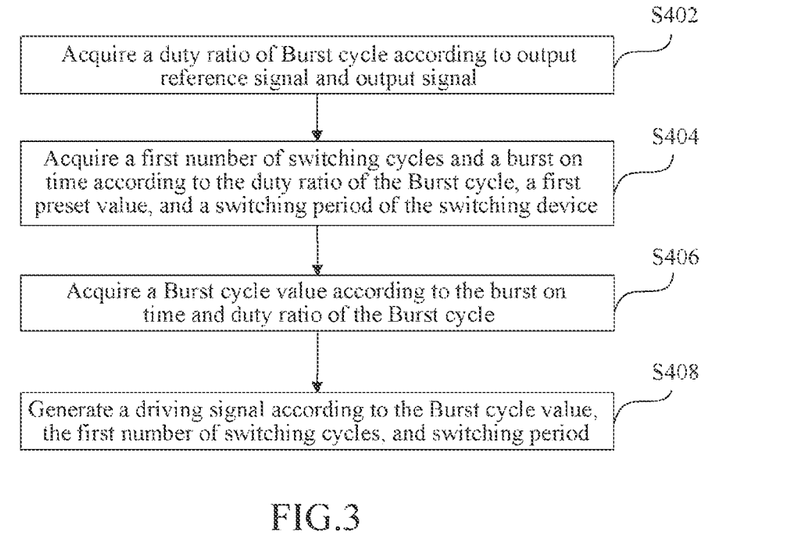
FIG. 3 schematically shows a flowchart of a control method for a DC converter according to an embodiment of the present disclosure.

An embodiment of the present disclosure provides a control method for a DC converter. The DC converter includes a switching circuit, a sampling circuit, and a controller. The sampling circuit is electrically connected with an output terminal of the DC converter and the controller, so as to sample an output signal of the DC converter and send the output signal to the controller. The controller is coupled to (through a wired connection or a wireless connection) the switching circuit to generate a driving signal according to the output signal, wherein the driving signal is used to drive one or more switching devices in the switching circuit. As shown in FIG. 3, the control method for the DC converter includes the following steps.

At a step S402, a duty ratio D1 of a Burst cycle is acquired according to an output reference signal and the output signal.

At a step S404, a first number of switching cycles Non1 and a burst on time Ton2 are acquired according to the duty ratio D1 of the Burst cycle, a first preset value Tset, and a switching period Ts of the switching device.

At a step S406, a Burst cycle value Tburst1 is acquired according to the burst on time Ton2 and the duty ratio D1 of the Burst cycle.

At a step S408, a driving signal is generated according to the Burst cycle value Tburst1, the first number of switching cycles Non1, and the switching period Ts.

The light-load intermittent control method (the Burst control method) in the embodiments of the present disclosure is suitable for frequency modulation control topologies, such as a full-bridge LLC or a half-bridge LLC, which can be applied to reduce the output voltage ripple. For example, by presetting a first preset value Tset, performing a close-loop control to an output signal of the DC converter, and adjusting a duty ratio of the burst on time in the Burst cycle, then the burst cycle value can be acquired and finally the driving signals for one or more switching devices are generated. The burst cycle value obtained according to this control method is not limited by the control cycle any more, so that the output voltage ripple can meet the load requirement.

For example, when LLC works in a Burst mode, in each control cycle, according to the first preset value Tset, a reference value of the output signal and a measured value of the output signal, and the switching period Ts during the burst on time, a digital control system (digital controller) can obtain a Burst cycle value Tburst1 and the burst on time Ton2, so as to generate the drive signals for the switching devices.

In the embodiment of the present disclosure, the switching circuit includes a primary circuit. For example, in a full-bridge DC converter, the primary circuit includes four switching devices SW1 to SW4 connected in parallel after two in series. The driving signal output by the controller is used to control on and off of the four switching devices. The switching devices can be IGBT (Insulated Gate Bipolar Transistor), MOSFET (Metal-Oxide-Semiconductor Field-Effect Transistor), gallium nitride GaN or silicon carbide SiC power device, and will not limited to this. During the burst on time, the switching devices all have the same switching period Ts.

In the embodiment of the present disclosure, the output signal may be, but is not limited to, an output voltage signal, an output current signal, or an output power signal.

In this embodiment, the first preset value can be set based on one or more parameters of a ripple factor, an output current of the DC converter, an output voltage of the DC converter, an output power of the DC converter, a duty ratio of the load, and a duty ratio of the Burst cycle. For example, the first preset value Tset may be selected according to the following method but not limited to the following method.

In one embodiment, the first preset value Tset can be set to a fixed constant, so that requirements for the output voltage ripple under various load conditions can be met.

In another embodiment, the first preset value Tset can be set according to one or more of an output power of the current load, an output current of the current load, a duty ratio of the current load, or a duty ratio of the Burst cycle, so as to achieve better results under different loads conditions. Where the duty ratio of the current load is the ratio of the current load power to the maximum output power in the Burst mode.

In the step S402, according to an instruction value of the output signal (i.e. the output reference signal) and a measured feedback value of the output signal (i.e. the output signal), the duty ratio D1 of the Burst cycle is acquired. The duty ratio D1 is a ratio of the burst on time and the Burst cycle value. For example, an output error signal is obtained by doing a subtraction between the output signal and the output reference signal (i.e. subtracting the output signal from the output reference signal or subtracting the output reference signal from the output signal), and then the output error signal is transmitted to an output regulation unit, and the duty ratio D1 of the Burst cycle is outputted by the output regulation unit.

In the step S404, a first period Ton1 is acquired according to the duty ratio D1 of the Burst cycle and the first preset value Tset.

In one embodiment, a product of the first preset value Tset and the duty ratio D1 of the Burst cycle can be used as the first period Ton1.

After that, a second number of switching cycles Non2 included in the first period Ton1 is acquired according to the first period Ton1 and the switching period Ts, and then the second number of switching cycles Non2 is rounded to obtain the first number of switching cycles Non1.

Herein, the rounding method may be rounding up to an integer, rounding off, or rounding down to an integer.

After that, the burst on time Ton2 is acquired according to the first number of switching cycles Non1 and the switching period Ts. For example, the burst on time Ton2 can be calculated by multiplying the switching period Ts by the first number of switching cycles Non1.

In the step S406, the actual Burst cycle value Tburst1 is calculated based on the burst on time Ton2 and the duty ratio D1 of the Burst cycle.

In the step S408, a burst off time Toff1 can be acquired according to the Burst cycle value Tburst1, the first number of switching cycles Non1 and the switching period Ts, or the burst off time Toff1 can be acquired directly by doing a subtraction between the Burst cycle value Tburst1 and the burst on time Ton2; and then the drive signal is generated according to the burst on time Ton2 and the burst off time Toff1.

Among them, a calculation formula of the burst off time Toff1 is as follows: the burst off time Toff1=Burst cycle value Tburst1−first number of switching cycles Non1*switching period Ts.

The Burst cycle value Tburst1, the burst on time Ton2, and the number of times that a switch was turned on during the burst on time (the first number of switching cycles Non1) are updated after each of the Burst cycles, so as to be used to generate the drive signal of the switching devices in the next Burst cycle. The number of switching cycles during the burst on time refers to the number of times that the switch SW1 (or switch SW2, or switch SW3, or switch SW4) has been turned on as shown in FIG. 1. Switch SW1, switch SW2, switch SW3, and switch SW4 all have the same number of times that was turned on in one switching cycle, i.e. all have the same number of switching cycles.

In the embodiment of the present disclosure, it is possible to reduce the switching loss by adjusting turn-on periods of respective switching devices corresponding to a positive interval and a negative interval of a first switching cycle within the burst on time.

Figure 4:
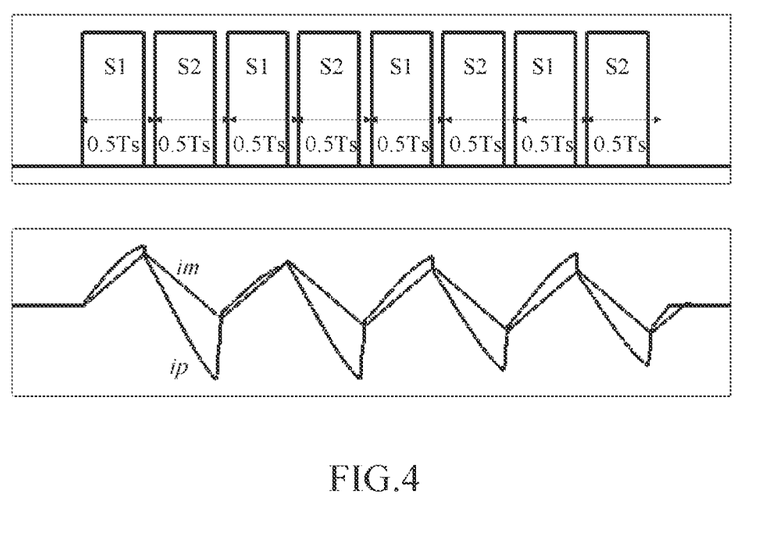
FIG. 4 schematically shows a schematic diagram of the driving signal waveform and the corresponding magnetizing current and resonance current of a DC converter according to an embodiment of the present disclosure.

During the burst on time, if a normal driving mode is used, that is, a positive half-cycle (i.e. the positive interval) and a negative half-cycle (i.e. the negative interval) are each approximately 50% duty cycle, as shown in FIG. 4, due to the bias of the magnetizing current im, the positive half-cycle and the negative half-cycle of the resonant current ip are asymmetrical, so that the ZVS is lost in positive half-cycles or negative half-cycles of the previous several switching cycles, and the switching loss increases accordingly.

In some embodiments of the present disclosure, the driving mode of the first switching cycle during the burst on time can be optimized to make the positive half-cycle and the negative half-cycle of the magnetizing current symmetrical as soon as possible, so as to facilitate the realization of ZVS and reduce the total switching loss.

Figure 5:
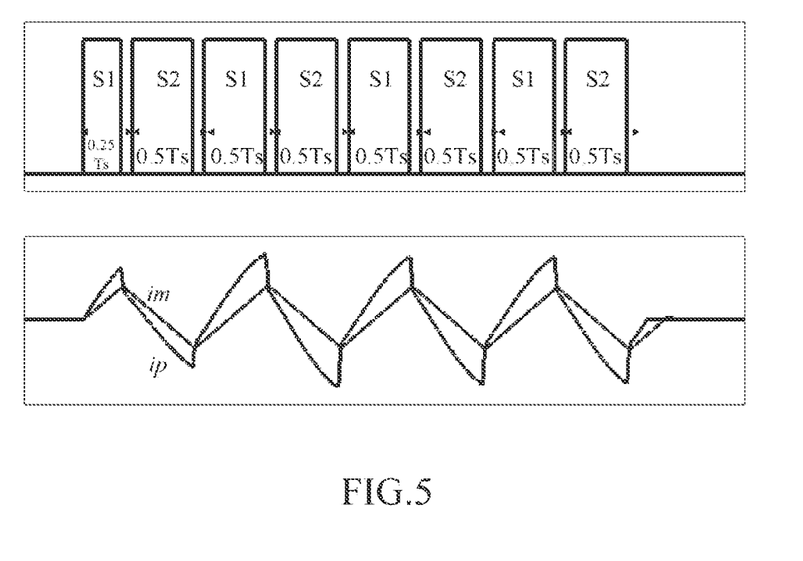
FIG. 5 schematically shows a schematic diagram of the driving signal waveform and the corresponding magnetizing current and resonance current of a DC converter according to another embodiment of the present disclosure.

In one embodiment, as shown in FIG. 5, in a first switching cycle during the burst on time, a turn-on period of the positive half-cycle is 0.25 Ts, and a turn-on period of the negative half-cycle is 0.5 Ts. In this way, turn-on periods of the switches SW1 and SW4 corresponding to the positive interval are 0.25 Ts, and turn-on periods of the switches SW2 and SW3 corresponding to the negative interval is 0.5 Ts, so that a balance of the magnetizing current im in the positive half-cycle and the negative half-cycle can be approximately reached after the first switching cycle. The duty ratio of the positive half-cycle and the negative half-cycle in each of remaining switching cycles is approximately 50%. As shown in FIG. 5, Ts is the switching period.

Figure 6:
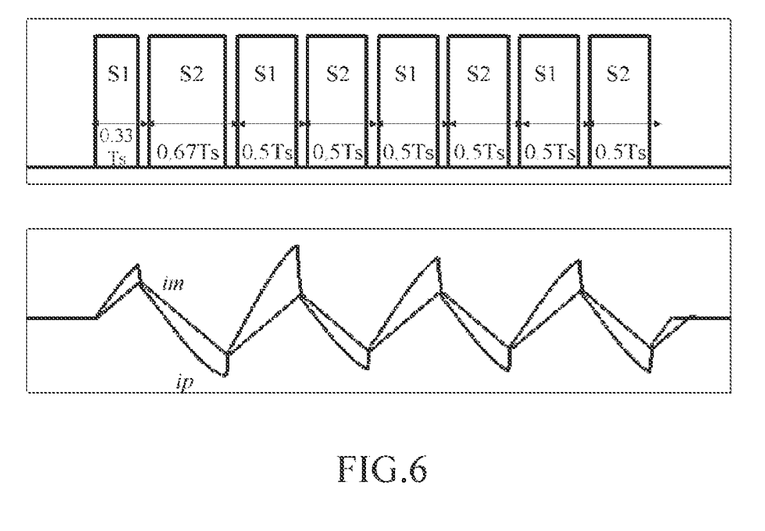
FIG. 6 schematically shows a schematic diagram of the driving signal waveform and the corresponding magnetizing current and resonance current of a DC converter according to another embodiment of the present disclosure.

In another embodiment, as shown in FIG. 6, in the first switching cycle during the burst on time, a turn-on period of the positive half-cycle is 0.33 Ts, a turn-on period of the negative half-cycle is 0.67 Ts, that is, the turn-on period of the positive half-cycle is about half of the turn-on period of negative half-cycle. In this way, the turn-on periods of the switches SW1 and SW4 corresponding to the positive interval are 0.33 Ts, and the turn-on periods of the switches SW2 and SW3 corresponding to the negative interval are 0.67 Ts, so that a balance of the magnetizing current im in the positive half-cycle and the negative half-cycle can be approximately reached after the first switching cycle. The duty ratio of the positive half-cycle and the negative half-cycle in each of remaining switching cycles is approximately 50%. As shown in FIG. 6, Ts is the switching period.

Figure 7:
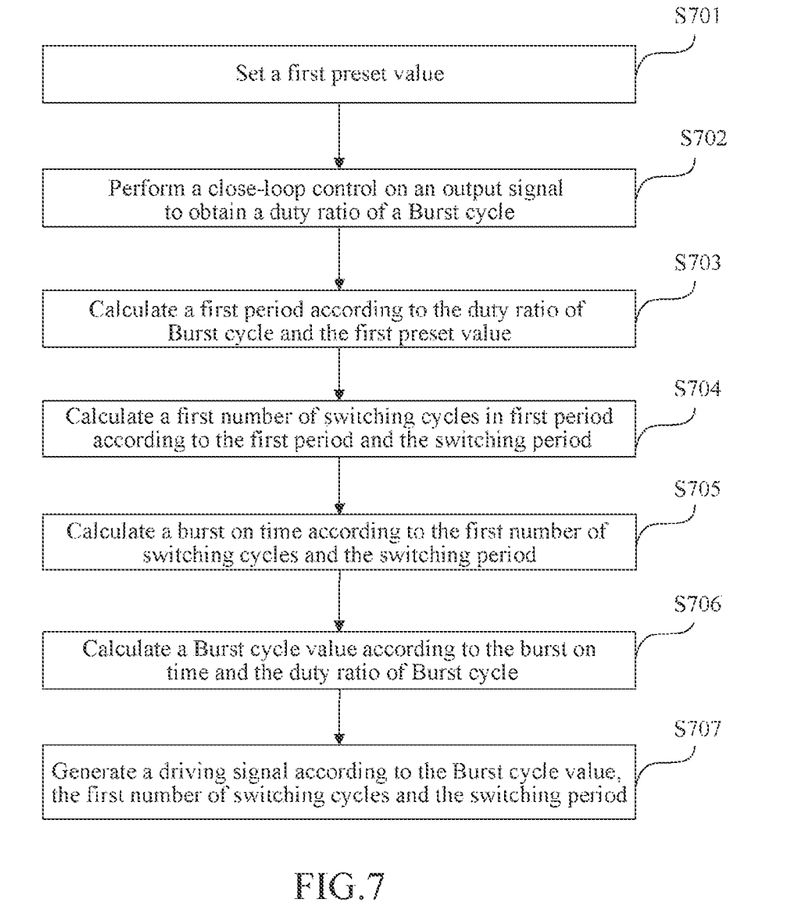
FIG. 7 schematically shows a flowchart of a control method for a DC converter according to another embodiment of the present disclosure.

As shown in FIG. 7, a control method for the DC converter provided by the embodiment of the present disclosure includes the following steps.

At a step S701, a first preset value is set.

At a step S702, a close-loop control is performed on an output signal to obtain a duty ratio of a Burst cycle.

At a step S703, a first period is calculated according to the duty ratio of the Burst cycle and the first preset value.

At a step S704, a first number of switching cycles in the first period is obtained according to the first period and the switching period, that is, according to the first period and the switching period, the number of times that a switch was turned on during the first period is calculated.

At a step S705, a burst on time is calculated according to the first number of switching cycles and the switching period.

At a step S706, a Burst cycle value is calculated according to the burst on time and the duty ratio of the Burst cycle.

At a step S707, according to the Burst cycle value, the first number of switching cycles and the switching period, a driving signal is generated.

Figure 8:
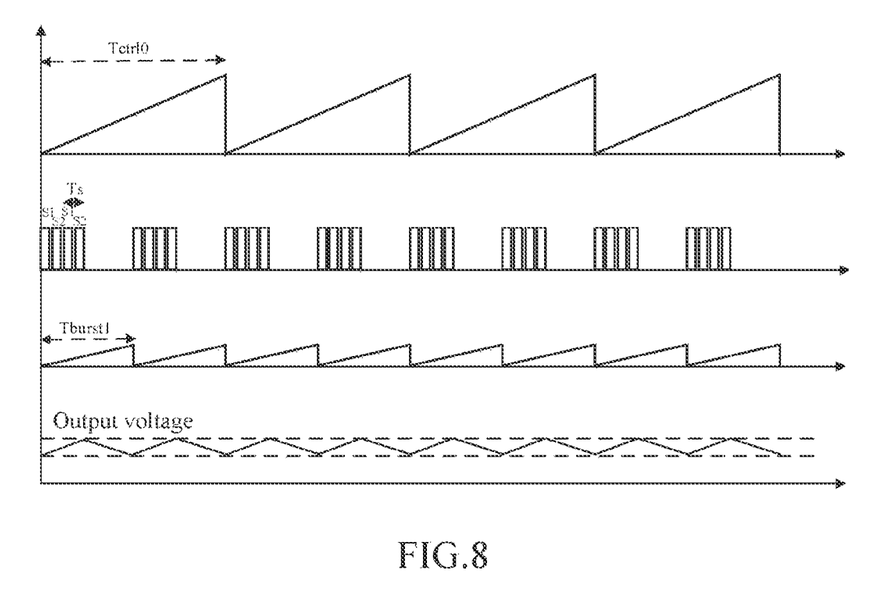
FIG. 8 schematically shows a schematic diagram of a driving signal waveform and the output voltage of a DC converter according to another embodiment of the present disclosure.

As shown in FIG. 8, in the embodiment of the present disclosure, in the Burst operation mode, a Burst cycle value Tburst1 is 0.5Tctrl0. In the closed-loop control steady state, the duty ratio of the Burst cycle is about 0.5, and when the pulse enable period is equal to 0.5Tburst1, the output voltage ripple is approximately equal to a quarter of an output voltage ripple when the Burst cycle value is 2Tctrl0, in which the output voltage ripple is greatly reduced.

Figure 9:
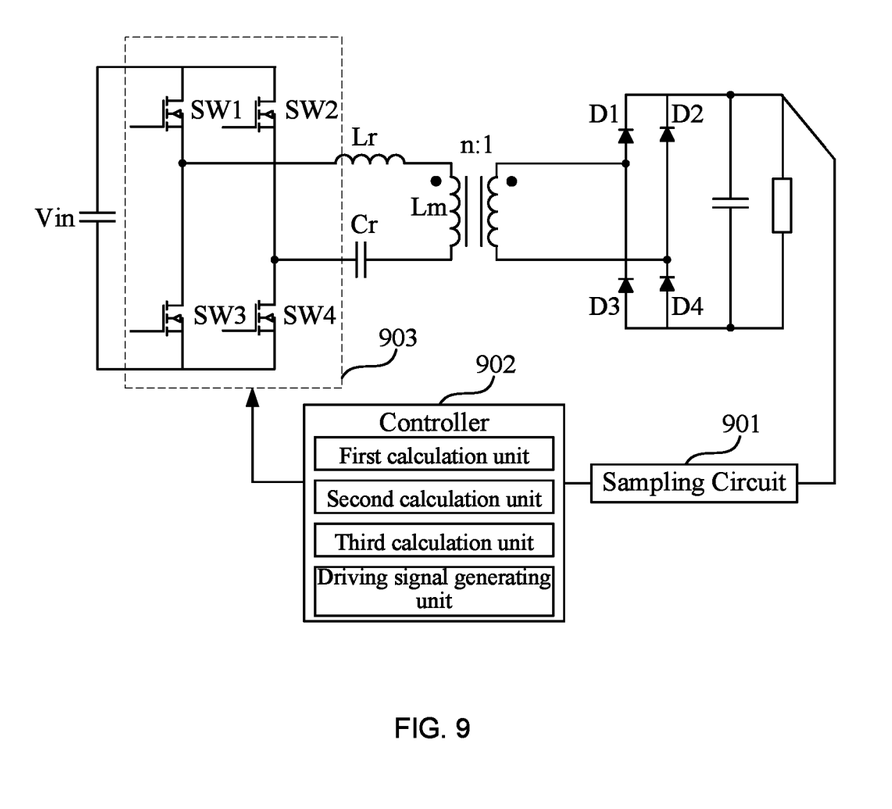
FIG. 9 schematically shows a structural diagram of a DC converter according to an embodiment of the present disclosure.

As shown in FIG. 9, an embodiment of the present disclosure also provides a DC converter. The DC converter includes a switching circuit, a sampling circuit 901, and a controller 902. The sampling circuit 901 is electrically connected with an output terminal of the DC converter and the controller 902, so as to sample the output signal of the DC converter and send it to the controller 902. The controller 902 is coupled to the switching circuit, and is used to generate and send a driving signal to drive one or more switching devices in the switching circuit. As shown in FIG. 9, four switching devices form a switching unit 903, and a driving signal drives the switching unit 903 to perform actions. The controller 902 is used to generate a driving signal according to the output signal, the first preset value, and the switching period of the switching device.

In the embodiment of the present disclosure, the DC converter may be a full-bridge LLC resonant converter or a half-bridge LLC resonant converter, or other resonant converters.

Furthermore, the controller may include a first calculation unit, a second calculation unit, a third calculation unit, and a driving signal generating unit, wherein the first calculation unit can also be called as a duty ratio calculation unit, the second calculation unit can be used to acquire a first number of switching cycles and a burst on time, and the third calculation unit can also be called as a Burst cycle calculation unit. The first number of switching cycles refers to the number of times that a switch device was turned on.

The first calculation unit is configured to acquire a duty ratio of a Burst cycle according to an output reference signal and the output signal.

The second calculation unit is configured to acquire the first number of switching cycles and the burst on time according to the duty ratio of the Burst cycle, the first preset value, and the switching period of the switching device.

The third calculation unit is configured to acquire a Burst cycle value according to the burst on time and the duty ratio of the burst cycle.

The driving signal generating unit is configured to generate a driving signal according to the Burst cycle value, the first number of switching cycles and the switching period.

Furthermore, the controller may further include a driving signal adjustment unit, which is configured to adjust turn-on periods of respective switching devices corresponding to a positive interval and a negative interval of the first switching cycle during the burst on time.

As shown in FIG. 9, the switching circuit includes a primary circuit. The primary circuit includes four switching devices connected in parallel after two in series, and the control signal is used to control the on and off of the four switching devices.

In the control method for a DC converter and the DC converter according to the embodiments of the present disclosure, by presetting a first preset value and performing a closed-loop control on the output signal (such as the output voltage, the output current, or the output power), and then adjusting the duty ratio of the burst on time in the Burst cycle, and the driving signal of the switching devices can be generated accordingly. By this way, the output voltage ripple can be decreased so as to meet the requirement of the load.

After considering the specification and practicing the disclosure disclosed herein, those skilled in the art will easily think of other embodiments of the present disclosure. This application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are pointed out by the following claims.

It should be understood that the present disclosure is not limited to the precise structure described above and shown in the accompanying drawings, and various modifications and changes can be made without departing from its scope. The scope of the present disclosure is only limited by the appended claims.

What is claimed is:

1. A control method for a DC converter, the DC converter comprises a switching circuit, a sampling circuit, and a controller, and the sampling circuit being electrically connected with an output terminal of the DC converter and the controller and configured to sample an output signal of the DC converter and send the output signal to the controller, and the controller being coupled to the switching circuit and configured to generate a driving signal according to the output signal, so as to drive a switching device in the switching circuit,
wherein the control method comprising following steps:
acquiring a duty ratio of a Burst cycle according to an output reference signal and the output signal;
acquiring a first number of switching cycles and a burst on time according to the duty ratio of the Burst cycle, a first preset value, and a switching period of the switching device;
acquiring a Burst cycle value according to the burst on time and the duty ratio of the Burst cycle; and
generating the driving signal according to the Burst cycle value, the first number of switching cycles, and the switching period.

2. The control method according to claim 1, wherein the step of acquiring the burst on time according to the duty ratio of the Burst cycle, the first preset value, and the switching period further comprising:
acquiring a first period according to the duty ratio of the Burst cycle and the first preset value;
acquiring the first number of switching cycles included in the first period according to the first period and the switching period; and
acquiring the burst on time according to the first number of switching cycles and the switching period.

3. The control method according to claim 2, wherein the step of acquiring the first number of switching cycles included in the first period according to the first period and the switching period further comprising:
acquiring a second number of switching cycles corresponding to the switching period, included in the first period, according to the first period and the switching period; and
rounding the second number of switching cycles to obtain the first number of switching cycles.

4. The control method according to claim 1, wherein the step of generating the driving signal according to the Burst cycle value, the first number of switching cycles, and the switching period further comprising:
acquiring the burst on time and a burst off time according to the Burst cycle value, the first number of switching cycles, and the switching period; and
generating the driving signal according to the burst on time and the burst off time.

5. The control method according to claim 1, wherein the first preset value is set based on one or more of a ripple factor, an output current of the DC converter, an output voltage of the DC converter, an output power of the DC converter, a duty ratio of a load, and the duty ratio of the Burst cycle.

6. The control method according to claim 1, wherein the DC converter is a full-bridge LLC resonant converter or a half-bridge LLC resonant converter.

7. The control method according to claim 1, further comprising:
adjusting turn-on periods of respective switching devices corresponding to a positive interval and a negative interval of a first switching cycle within the burst on time.

8. The control method according to claim 1, wherein the output signal is an output voltage signal, an output current signal or an output power signal.

9. A DC converter, wherein the DC converter comprises a switching circuit, a sampling circuit and a controller,
wherein the sampling circuit is electrically connected with an output terminal of the DC converter and the controller, and configured to sample an output signal of the DC converter and send the output signal to the controller;
the controller is coupled to the switching circuit and configured to generate and send a driving signal to drive a switching device in the switching circuit, wherein the controller is configured to generate the driving signal according to the output signal, a first preset value, and a switching period of the switching device;
wherein the controller comprises:
a first calculation unit configured to acquire a duty ratio of a Burst cycle according to an output reference signal and the output signal;
a second calculation unit configured to acquire a first number of switching cycles and a burst on time according to the duty ratio of the Burst cycle, the first preset value, and the switching period of the switching device;
a third calculation unit configured to acquire a Burst cycle value according to the burst on time and the duty ratio of the Burst cycle; and
a driving signal generating unit configured to generate the driving signal according to the Burst cycle value, the first number of switching cycles and the switching period.

10. The DC converter according to claim 9, wherein the DC converter is a full-bridge LLC resonant converter or a half-bridge LLC resonant converter.

11. The DC converter according to claim 9, wherein the controller further comprises a drive signal adjustment unit, the drive signal adjustment unit is configured to adjust turn-on periods of respective switching devices corresponding to a positive interval and a negative interval of a first switching cycle within the burst on time.

12. A control method for a DC converter, the DC converter comprises a switching circuit, a sampling circuit, and a controller, and the sampling circuit being electrically connected with an output terminal of the DC converter and the controller, and configured to sample an output signal of the DC converter and send the output signal to the controller, and the controller being coupled to the switching circuit and configured to generate a driving signal according to the output signal, so as to drive a switching device in the switching circuit, wherein the control method comprising following steps:

setting a first preset value;

performing a close-loop control on the output signal to obtain a duty ratio of a Burst cycle;

calculating a first period according to the duty ratio of the Burst cycle and the first preset value;

calculating a first number of switching cycles within the first period, according to the first period and the switching period;

calculating a burst on time according to the first number of switching cycles and the switching period;

calculating a Burst cycle value according to the burst on time and the duty ratio of the Burst cycle; and generating the driving signal according to the Burst cycle value, the first number of switching cycles and the switching period.

13. The control method according to claim 12, wherein the step of calculating the first number of switching cycles within the first period according to the first period and the switching period further comprising:

acquiring a second number of switching cycles included in the first period according to the first period and the switching period; and rounding the second number of switching cycles to obtain the first number of switching cycles.

14. The control method according to claim 12, wherein the step of generating a driving signal according to the Burst cycle value, the first number of switching cycles and the switching period further comprising:

acquiring the burst on time and a burst off time according to the Burst cycle value, the first number of switching cycles, and the switching period; and generating the driving signal according to the burst on time and the burst off time.

15. The control method according to claim 12, wherein the first preset value is set based on one or more of a ripple factor, an output current of the DC converter, an output voltage of the DC converter, an output power of the DC converter, a duty ratio of a load, and a duty ratio of the Burst cycle.

16. The control method according to claim 12, wherein the DC converter is a full-bridge LLC resonant converter or a half-bridge LLC resonant converter.

17. The control method according to claim 12, further comprising:

adjusting turn-on periods of respective switching devices corresponding to a positive interval and a negative interval of a first switching cycle within the burst on time.

18. The control method according to claim 17, wherein the turn-on period of respective switching device in a positive interval of the first switching cycle is smaller than the turn-on period of respective switching device in a negative interval of the first switching cycle.

19. The control method according to claim 12, wherein the output signal is an output voltage signal, an output current signal or an output power signal.

* * * * *